United States Patent [19]
Urakami

[11] 4,095,378
[45] Jun. 20, 1978

[54] DEVICE CAPABLE OF SUCTION-ADHERING TO A WALL SURFACE AND MOVING THEREALONG

[76] Inventor: Fukashi Urakami, Tategaoka-danchi 3-8-410, No. 1097, Tatemachi, Hachioji-shi, Tokyo, Japan

[21] Appl. No.: 750,416

[22] Filed: Dec. 14, 1976

[30] Foreign Application Priority Data

Dec. 18, 1975 Japan ................... 50/152362
Jan. 19, 1976 Japan ................... 51/5497[U]
Feb. 26, 1976 Japan ................... 51/23577[U]
Jan. 22, 1976 Japan ................... 51/6256[U]

[51] Int. Cl.$^2$ .......................... B24C 3/06; B24C 9/00; B63B 59/00; F04H 3/20
[52] U.S. Cl. .......................................... 51/425; 15/1.7; 51/429; 51/432; 114/222; 118/305; 180/115
[58] Field of Search ................ 51/424, 425, 429, 431, 51/432, 433, 273; 180/115, 1 VS; 114/224, 222; 118/305, 108, 207; 134/172, 174; 15/1.7, 302

[56] References Cited
U.S. PATENT DOCUMENTS

| | | | |
|---|---|---|---|
| 2,455,514 | 12/1948 | Mead | 51/9 M |
| 2,729,918 | 1/1956 | Van Den Burgh | 51/9 M X |
| 2,766,557 | 10/1956 | Pollard | 51/8 BR |
| 3,609,916 | 10/1971 | Hammelmann | 51/8 R |
| 3,627,562 | 12/1971 | Hammelmann | 114/222 X |
| 3,777,834 | 12/1973 | Hiraoka | 51/9 M |
| 3,788,010 | 1/1974 | Goff | 51/273 X |
| 3,934,372 | 1/1976 | Diehn | 51/9 M X |
| 3,958,652 | 5/1976 | Urakami | 180/1 US |
| 3,991,842 | 11/1976 | Larsen | 180/115 |

*Primary Examiner*—Harold D. Whitehead
*Assistant Examiner*—Nicholas P. Godici

[57] ABSTRACT

A device capable of suction-adhering to a wall surface by the pressure of an ambient fluid, and of moving along the wall surface. The device includes a pressure receiver housing made of a rigid or semi-rigid material; a plurality of wheels or endless tracks secured to the housing so as to make contact with the wall surface; a partition connected to the housing and having a free end adapted to make contact with the wall surface, at least the free end being made of a relatively flexible material, the partition being adapted to define a substantially fluid-tight low pressure area together with the wall surface and the housing or together with the wall surface alone; and means for discharging a fluid from the low pressure area. The partition has a portion extending outwardly from the position at which it is connected to the housing, and by a relatively small force, at least its free end can be displaced toward and away from the wall surface with respect to the housing. The free end is brought into contact substantially fluid-tight with the wall surface by the fluid pressure which acts on the partition owing to the difference in fluid pressure between the inside and outside of the low pressure area. The fluid pressure acting on the housing is transmitted to the wall surface through the wheels or endless tracks, thereby to cause the device to adhere to the wall surface.

37 Claims, 23 Drawing Figures

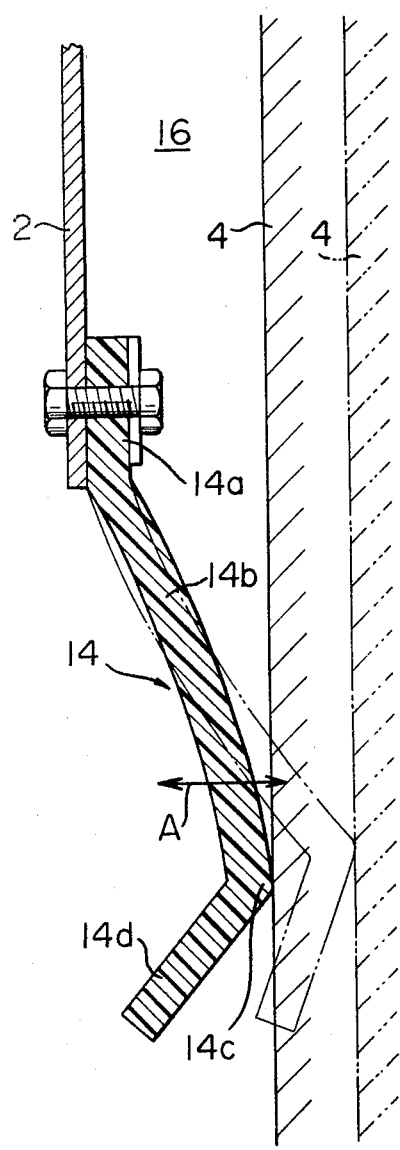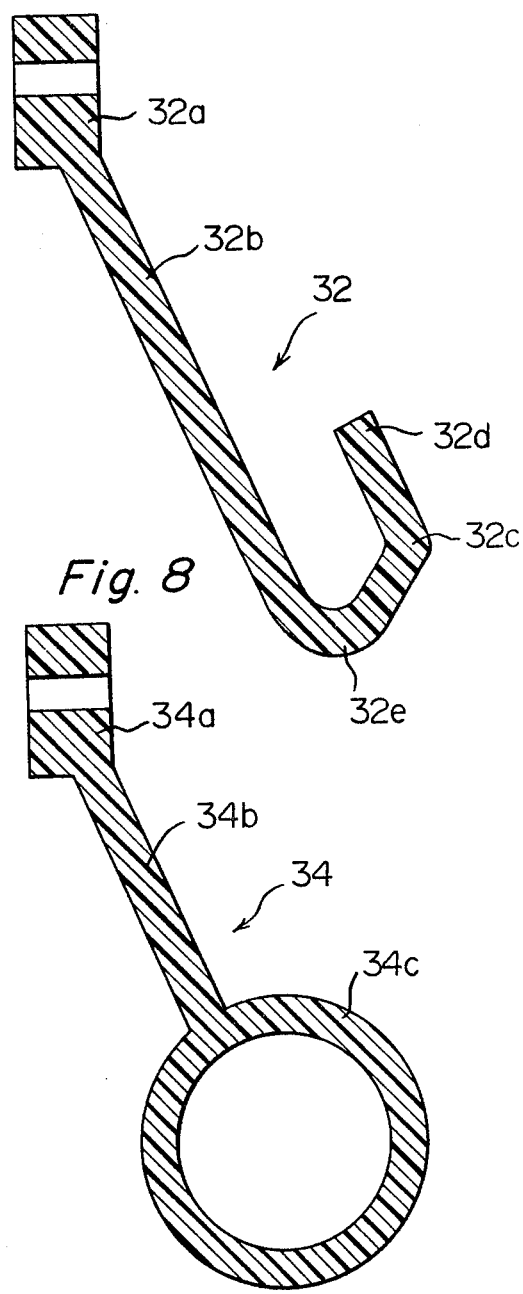

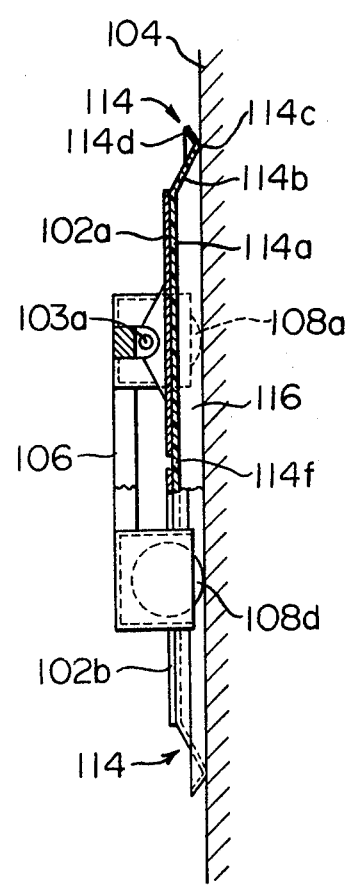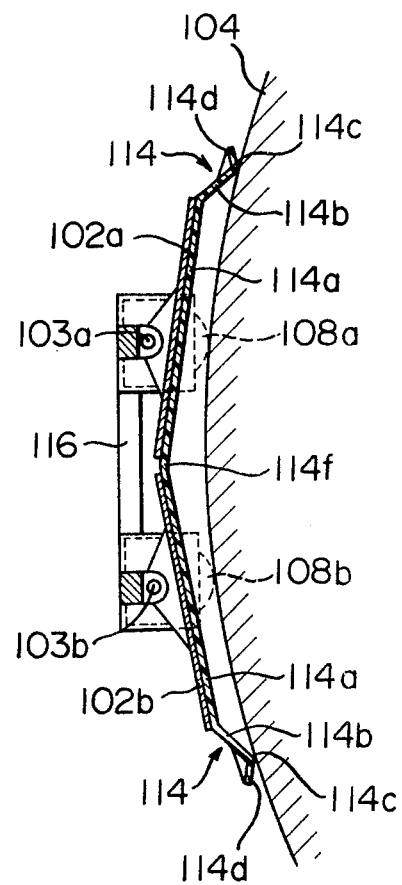

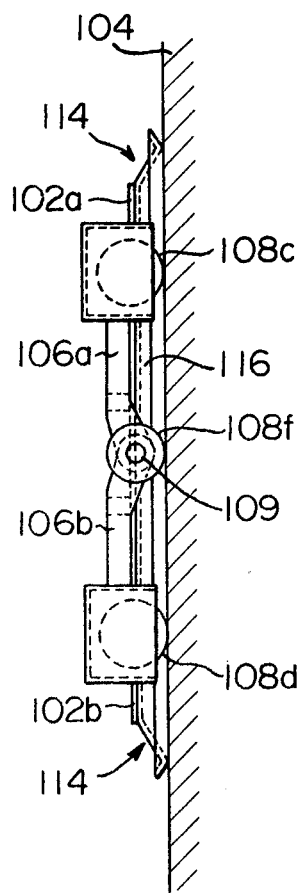
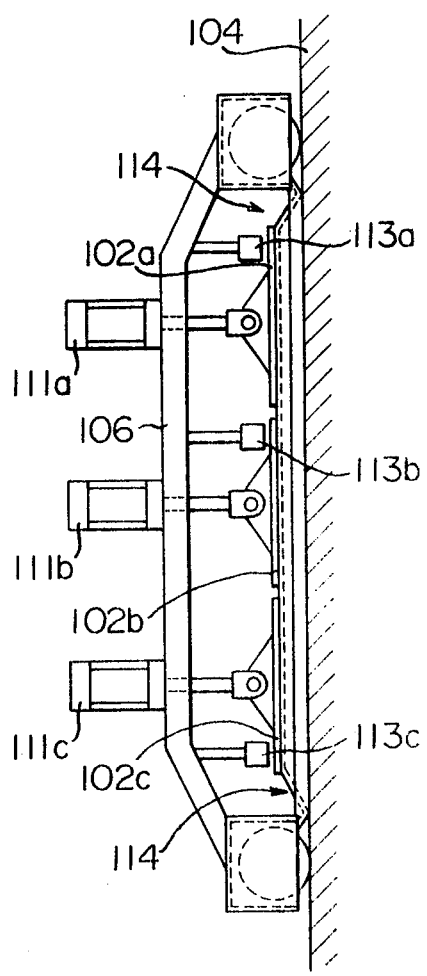

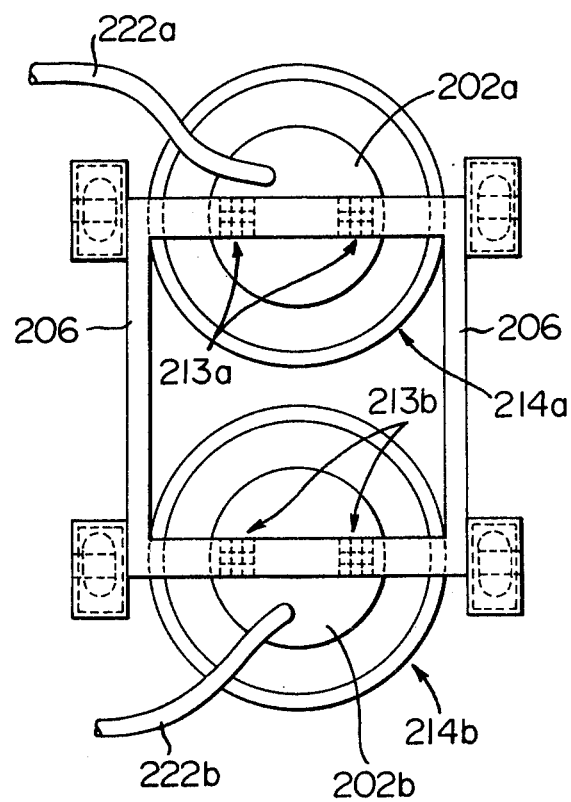

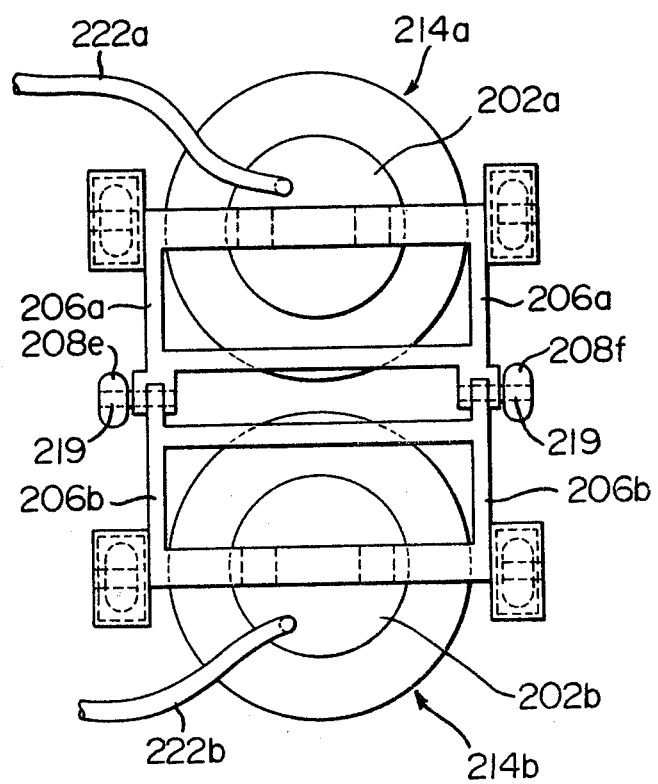

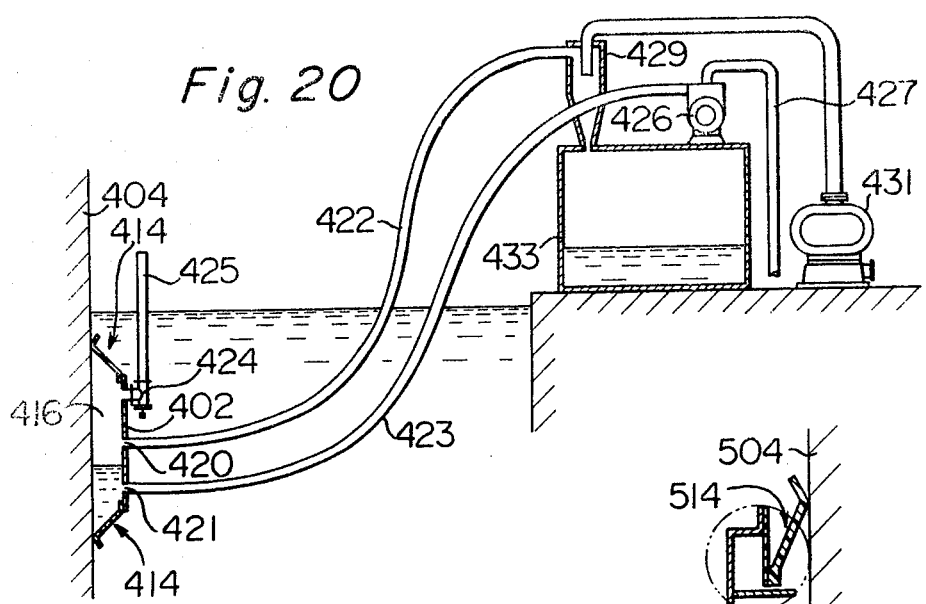
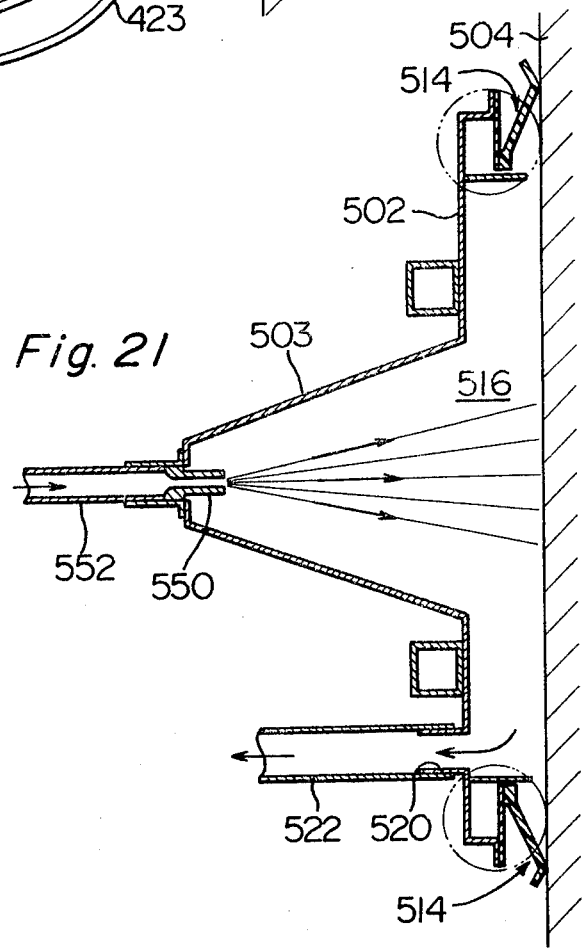

DEVICE CAPABLE OF SUCTION-ADHERING TO A WALL SURFACE AND MOVING THEREALONG

FIELD OF THE INVENTION

This invention relates to a device which can adhere by suction to a wall surface by the pressure of an ambient fluid such as air or water and move along the wall surface. More specifically, the invention relates to a device which can adhere to a wall surface by suction and move along it thereby to perform various work such as the cleaning or painting of wall surfaces, although the invention is not limited to these applications.

DESCRIPTION OF THE PRIOR ART

Prior devices suggested for performing various work such as cleaning or painting of perpendicular or inclined wall surfaces such as the outside wall surfaces of ships, oil reservoir tanks and tall buildings include, for example, a device comprising a housing having an opening at a portion facing a wall surface; a plurality of wheels provided in the housing so as to make contact with the wall surface; an electric motor for driving the wheels; a substantially air-permeable partition made of a brush-like flexible material fixed to the periphery of the opening of the housing, said partition extending through a space which is formed between the housing and the wall surface when the wheels make contact with the wall surface; an evacuating means for evacuating the inside of the housing to maintain it under a vacuum; and a work-performing means disposed inside or outside the housing (see, for example, Japanese Patent Publication No. 42,798/72 and U.S. Pat. No. 2,455,514).

In this type of device, a vacuum is formed within the housing by the evacuating means, and the gas pressure which acts on the housing owing to the pressure difference between the inside and the outside of the housing is transmitted to the wall surface via the wheels, whereby the device is caused to adhere to the wall surface by suction. Furthermore, the device adhering to the wall surface is moved along the wall surface by driving the wheels. Accordingly, this device can adhere to the wall surface by suction and move along it while performing the desired work, such as the cleaning or painting of the wall surface, by the work performing means provided therein.

The conventional device, however, has the following problem to be solved. Since the partition fixed to the peripheral portion of the opening of the housing is substantially air-permeable, a considerable amount of the outside air comes into the housing through the partition while the inside of the housing is being evacuated by the evacuating means. The evacuating means should, therefore, have a very high capacity in order to form sufficient vacuum within the housing to allow the device to adhere to the wall surface.

The use of a non-airpermeable partition to replace the air-permeable partition would apparently be helpful in solving this problem. But the problem still cannot be solved by using the non-airpermeable partition in the usual manner. Specifically, when the non-permeable partition is made of a relatively flexible material such as a synthetic or natural rubber, evacuation of the inside of the housing causes a pressure difference between the inside and outside of the housing, and results in the exertion on the partition of the gas pressure which acts in a direction for bending the partition inwardly of the housing. This gas pressure causes the partition to be bent inwardly of the housing and to break the fluid-tight seal between the periphery of the opening of the housing and the wall surface, and thus admit the outside air into the housing.

In order to prevent this, the use of a partition made of a relatively rigid material may be suggested. Since, however, the end of the partition must extend even a little beyond the tread of a wheel and make intimate contact with the wall surface in order to form a fluid-tight seal between the periphery of the opening of the housing and the wall surface, the gas pressure which acts on the housing owing to the pressure difference between the inside and outside of the housing upon formation of vacuum within the housing is transmitted to the wall surface not through the wheel but rather through the partition, and consequently, the contact pressure between the end of the partition and the wall surface becomes considerably larger than the contact pressure between the wheel and the wall surface. This difference is particularly outstanding when the wall surface is not a flat surface but a curved or roughened surface. Accordingly, even when a driving force is supplied to the wheel, it slips and idly rotates since the frictional resistance between the end of the partition and the wall surface is higher than the frictional resistance between the wheel and the wall surface. It is impossible or extremely difficult, therefore, to move the device along the wall surface.

SUMMARY OF THE INVENTION

Accordingly, it is a primary object of this invention to provide a device capable of adhering to a wall surface by suction and moving along it and yet which is free from the defects of the conventional devices described hereinabove, and in which a low pressure of a sufficient degree to cause the device to adhere to the wall surface can be formed within a low pressure area or housing by an evacuating means having a relatively low capacity, and the adhering device can be moved relatively easily along the wall surface.

Another object of this invention is to provide a device of the above structure which can adhere closely to a wall surface by suction even when the wall surface is not flat but curved or uneven.

Still another object of this invention is to provide a device of the above structure which is equipped with a wall surface cleaning device, in which particles of a polishing and cleaning material such as grit impinged against the wall surface for its cleaning can be collected for reuse by utilizing an evacuating means for producing a low pressure in a low pressure area.

According to the present invention, there is provided a device capable of adhering by suction to a wall surface by the pressure of an ambient fluid and moving along the wall surface, which comprises a pressure receiver housing made of a rigid or semi-rigid material, a plurality of wheels or endless tracks secured to the housing so as to make contact with the wall surface, a partition connected to the pressure receiver housing with its free end being adapted to make contact with the wall surface, at least the free end thereof being made of a relatively flexible material, the partition being adapted to define a substantially fluid-tight low pressure area together with the pressure receiver housing and the wall surface or together with the wall surface alone, and means for discharging a fluid from the low pressure area; wherein the partition has a portion extending outwardly from a position at which it is connected to the pressure receiver housing, and at least its free end is adapted to be displaced toward and away from the wall surface with respect to the pressure receiver housing by a relatively small force, the free end being adapted to make contact substantially fluidtight with the wall surface by the pressure of the fluid which acts on the partition itself owing to the difference in fluid pressure between the inside and outside of the low pressure area; and wherein the fluid pressure acting on the pressure receiver housing owing to the difference in fluid pressure between the inside and outside of the low pressure area is transmitted to the wall surface through the wheels or endless tracks whereby the device is caused to adhere to the wall surface.

In the device of this invention, at least the free end (i.e., the part which is to contact the wall surface) of the partition can be displaced toward and away from the wall surface with respect to the pressure receiver housing by a relatively small force, and the partition has a portion extending outwardly from the portion connected to the housing. Hence, the fluid pressure which acts on the partition itself owing to the difference in fluid pressure between the inside and outside of the low pressure area acts to bring the free end of the partition into fluid-tight contact with the wall surface. Consequently, the low pressure area defined by the pressure receiver housing, the partition and the wall surface is exactly maintained substantially fluid-tight, and a low pressure of a sufficient degree to cause the adhesion of the device to the wall surface can be formed within the low pressure area by using an evacuating means having a relatively low capacity.

Furthermore, because at least the free end of the partition is adapted to be displaced toward and away from the wall surface by a relatively small force, substantially all of the fluid pressure acting on the pressure receiver housing owing to the difference in fluid pressure between the inside and outside of the low pressure area is transmitted to the wall surface not via the partition but via the wheels or endless tracks, whereby the device is caused to adhere to the wall surface by suction. The contact pressure between the wheels or endless tracks and the wall surface is considerably larger than that between the free end of the partition and the wall surface, and therefore, the frictional resistance between the wheels or endless tracks and the wall surface becomes considerably larger than that between the free end of the partition and the wall surface. The device can, therefore be moved by driving the wheels or endless tracks.

The displacement of at least the free end of the partition toward and away from the wall surface by a relatively small force can be achieved by connecting the partition to the pressure receiver housing via a means for elongating, contracting or deflecting the partition toward and away from the wall surface by a relatively small force, and/or by forming at least a part of the partition from a flexible material so that this part can be deflected toward and away from the wall surface by a relatively small force.

BRIEF DESCRIPTION OF THE DRAWINGS

FIGS. 5 and 6, similar to FIG. 4, show modifications of the joint part between the pressure receiver housing and the partition;

FIGS. 7 and 8 are enlarged sectional view showing modifications of the partition;

FIGS. 9, 12, 15, 16 and 18 are front elevations showing various modified embodiments of the device of this invention;

FIG. 10 is a sectional elevation, partly in section, taken along the line X—X of FIG. 9;

FIG. 11 is a sectional view taken along the line XI—XI of FIG. 9;

FIG. 13 is a side elevation of the device shown in FIG. 12;

FIGS. 14 and 17 are side elevations showing modified embodiments of the device of this invention;

FIG. 20 is a simplified sectional view showing a modified embodiment of the device of this invention which is suitable for use when the wall surface is under water; and FIGS. 21, 22 and 23 are simplified sectional views showing embodiments of the device of this invention which are equipped with means for impinging particles of a polishing and cleaning material against the wall surface.

DETAILED DESCRIPTION OF PREFERRED EMBODIMENTS

Figure 1:
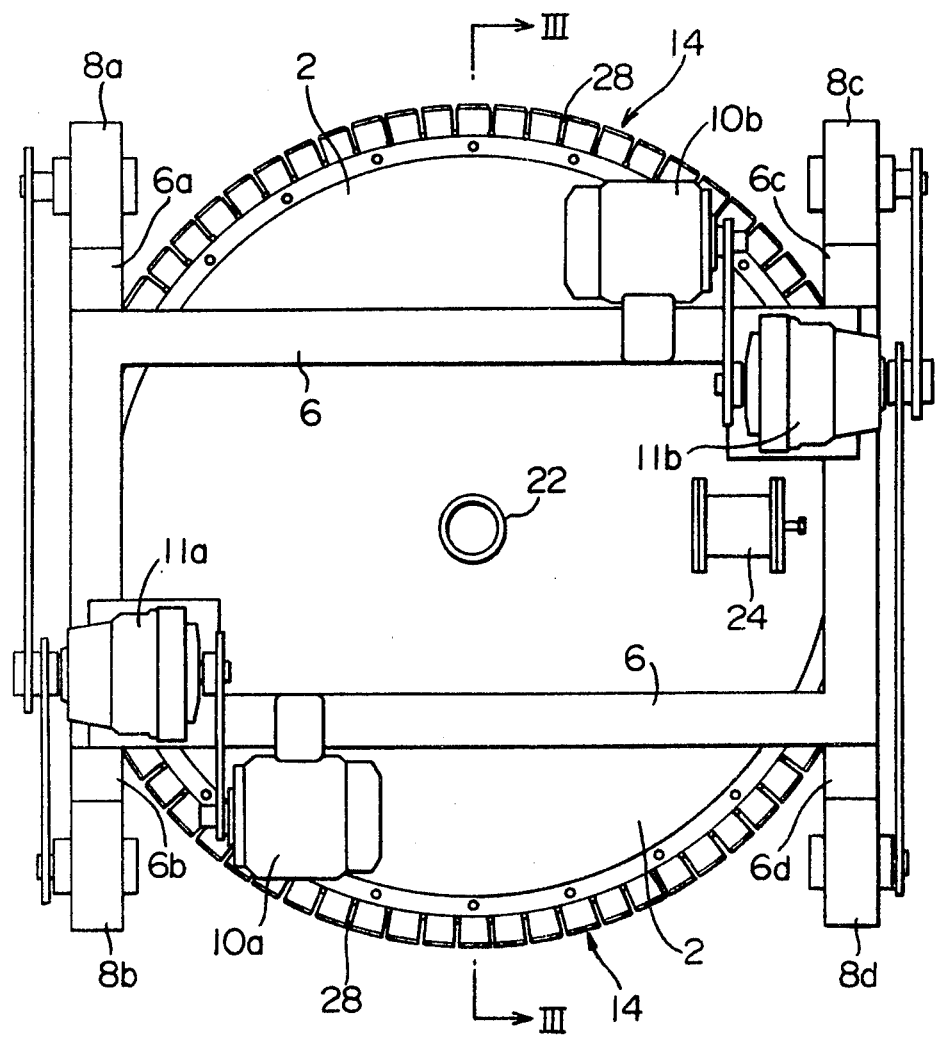
FIG. 1 is a front elevation of one embodiment of the device of this invention.

Referring to FIGS. 1 to 4, preferred embodiments of the device of this invention will be described.

The device in accordance with this invention includes a pressure receiver housing 2 made of a rigid or semi-rigid material such as a steel sheet. The pressure receiver housing 2 may be of any desired configuration which can form a substantially fluid-tight low pressure space together with a partition and a wall surface 4 to be described in detail hereinbelow. In the embodiment shown, the housing is generally circular. A rigid frame member 6 is secured to the outside surface of the pressure receiver housing 2, and wheels 8a, 8b, 8c and 8d are rotatably mounted on four leg portions 6a, 6b, 6c and 6d of the frame member 6. As will be described hereinbelow, these wheels 8a, 8b, 8c and 8d are urged against the wall surface 4 and brought into contact with it by the pressure of an ambient fluid such as air which acts on the pressure receiver housing. The frame member 6 includes a drive means for rotating the wheels 8a, 8b, 8c and 8d which is preferably composed of two electric motors 10a and 10b capable of rotating in both directions. The motor 10a is connected to the wheels 8a and 8b through a reduction gear mechanism 11a and a suitable interlocking means such as a sprocket or chain to drive the wheels 8a and 8b. Likewise, the motor 10b is connected to the wheels 8c and 8d through a reduction gear mechanism 11b and a suitable interlocking means such as sprocket or chain to drive the wheels 8c and 8d.

In the embodiment shown, four wheels are used, but alternatively, three wheels arranged in a triangular shape, or more than four wheels may be used. Furthermore, instead of the wheels, two or more endless tracks may be used. Also, in the embodiments used, two motors are used to drive the wheels, but if desired, all of the wheels may be driven by a single motor. Instead of driving all the wheels, it is possible to drive only the desired number of wheels.

A partition 14 is connected to the peripheral edge of the pressure receiver housing 2 via an annular member 12 made of a flexible material which can deflect toward and away from the wheel surface 4 (that is, the direction shown by arrow A) by a relatively small force. As most clearly shown in FIG. 4, the peripheral part of the annular member 12 is fixed to a flange portion 2a of the pressure receiver housing 2 by a suitable means such as a nut or bolt. To the inner peripheral portion of the annular member 12 is connected one end 14a of the partition 14 which is generally of a substantially hollow conical shape. The partition 14 in the embodiment shown has a part 14b extending outwardly and toward the wall surface 4 from the one end 14a fixed to the inner peripheral apart of the annular member 12, the other end (that is, the free end) 14c which is to make contact with the wall surface 4, and an extension 14d which preferably extends from the free end 14c outwardly and away from the wall surface 4. The partition 14, as most clearly shown in FIG. 3, defines a substantially fluid-tight low pressure space 16 together with the pressure receiver housing 2 and the wall surface 4. In order to define the substantially fluid-tight low pressure space 16, at least the free end 14c of the partition 14, and preferably the entire partition 14, is made of a relatively flexible material such as a synthetic or natural rubber so that the gas pressure acting on the partition 14 will cause the free end portion 14c to make fluid-tight contact with the wall surface, as will be described in detail hereinbelow. Preferably, that surface of the free end 14c which is to make contact with the wall surface 4 has a surface coating of a low coefficient of friction such as a fluorine resin (e.g., Teflon) in order to reduce the frictional resistance between it and the wall surface 4.

To the pressure receiver housing 2 is further fixed a cylindrical guide wall 18 to be described in detail hereinbelow which guides the end 14a of the partition 14. An exhaust opening 20 is provided at the center of the pressure receiver housing 2 in order to discharge a fluid from the low pressure space 16. The exhaust hole 20 is caused to communicate with a suitable evacuating means (not shown) such as a vacuum pump, water pump, or ejector via a suitable connection 22 such as a flexible hose.

The operation and advantages of the device will be described. A low pressure is created within the low pressure area 16 by operating an evacuating means set up on the ground or on a boat deck, etc. As a result, the pressure of an ambient fluid acts on the pressure receiver housing 2 owing to the differences in fluid pressure between the inside and outside of the low pressure space 16. Since the partition 14 is connected to the housing 2 via the member 12 which can deflect toward and away from the wall surface 4 (i.e., in the direction shown by arrow A) by a relatively small force, and the wheels 8a to 8d are provided on the housing 2 by means of the rigid frame member 6, substantially all of the fluid pressure acting on the pressure receiver housing 2 is transmitted to the wall surface 4 via the wheels 8a to 8d, thereby to cause the entire device to adhere to the wall surface 4 by suction.

On the other hand, the fluid pressure acting on the portion 14b of the partition 14 owing to the difference in fluid pressure between the inside and outside of the low pressure space 16 acts to urge the partition 14 toward the wall surface 4 to bring the free end 14c of the partition 14 into fluid-tight contact with the wall surface 4, because the portion 14b extends outwardly from the portion 14a toward the free end 14c. As stated hereinabove, the end 14a of the partition 14 is connected to the housing 2 via the member which can deflect in the direction of arrow A by a relatively small force. Thus, even when the wall surface 4 has raised and depressed portions, or is curved, the partition 14 is displaced in the direction of arrow A, as shown by solid lines and two-dot chain lines in FIG. 4, by a relatively small force according to the distance between the wall surface 4 and the housing 2 (that is, the distance between the tread of a wheel and the housing 2), and the free end 14c of the partition 14 is brought into fluid-tight contact with the wall surface 4 only by the fluid pressure that acts on the partition 14. The guide wall 18 fixed to the housing 2 guides the end 14a when the partition 14 is displaced in the direction of arrow A.

Since the free end 14c of the partition is always brought into fluid-tight contact with the wall surface 4, and the low pressure space 16 defined by the housing 2, the partition 14 and the wall surface 4 is substantially fluid-tight, vacuum of a sufficient degree to cause the device to adhere to the wall surface 4 can be formed within the low pressure space 16 by an evacuating means with relatively low capacity. It is to be understood however that since a wall surface to be cleaned or coated, such as the outside wall surfaces of ships, oil reservoir tanks, or tall buildings is generally not a flat surface, but a roughened surface having considerable raised and depressed portions. The free end 14c of the partition 14 is not brought into complete fluid-tight contact with the wall surface 4, but some outside air comes into the low pressure space 16 from between the free end portion 14c and the wall surface 4.

Where the wall surface 4 is a substantially flat smooth surface, the free end 14c is caused to make fluid-tight contact almost completely. In such a case, an excessive degree of vacuum is formed within the low pressure space 16 by the evacuating means, and therefore, an excessive fluid pressure acts on the housing 2. Consequently, an excessive stress is formed in the housing 2, the frame member 6 or the wheels 8a to 8d, and these elements are likely to be damaged. Preferably, therefore, a low pressure breaker 24 (FIGS. 1 and 2) of a known type is secured to the housing 2. The low pressure breaker 24 functions to admit outside air into the low pressure space 16 when the degree of low pressure within it exceeds a certain limit, and thus adjust the degree of low pressure so that it is below this limit.

When the motors 10a and 10b are operated to rotate the wheels 8a and 8b, and wheels 8c and 8d in the same direction by, for example, a remote controlling operation, the device of this invention moves straight along the wall surface 4. When the wheels 8a and 8b are rotated in the opposite direction to the wheels 8c and 8d, the device revolves around the central axial line of the device to turn it in the desired direction. In this regard, in the device of this invention, in spite of the fact that the free end 14c of the partition 14 is in substantially fluid-tight contact with the wall surface 4, the partition 14 is displaced toward and away from the wall surface 4 by a relatively small force. For this reason, substantially all of the fluid pressure acting on the pressure receiver housing 2 is transmitted to the wall surface via the wheels 8a to 8d, and on the other hand, the free end 14c of the partition 14 is brought into contact with the wall surface 4 only by the fluid pressure which acts on the portion 14b of the partition 14.

In the device of this invention, the frictional force $F_1$ (kg) between the wheels 8a to 8d and the wall surface 4 is expressed by the following equation.

$$F_1 = K_1 \cdot V \cdot D_1$$

wherein $D_1$ is the effective pressure receiving area in cm$^2$ of the housing, V is the degree of vacuum in kg/cm$^2$ of the inside of the low pressure area, and $K_1$ is the coefficient of friction between the wheels 8a to 8c and the wall surface 4.

On the other hand, the frictional force $F_2$ (kg) between the free end 14c of the partition 14 and the wall surface 4 is defined by the following equation.

$$F_2 = K_2 \cdot V \cdot D_2$$

wherein $D_2$ is the effective pressure receiving area in cm$^2$ of the partition 14, $K_2$ is the coefficient of friction between the free end 14c of the partition 14 and the wall surface 4, and V is as defined above. Accordingly, the wheels 8a to 8d can be driven if the following relation is met.

$$F_1 > F_2$$

Namely, $$K_1 \cdot D_1 > K_2 \cdot D_2$$

In the conventional devices, the partition cannot be displaced toward and away from the wall surface 4 with respect to the housing 2, and therefore, the fluid pressure acting on the housing 2 is transmitted to the wall surface 4 not via the wheels but via the partition. Accordingly, the frictional force $F_1$ between the wheels and the wall surface cannot be made larger than that ($F_2$) between the partition and the wall surface, and it is impossible or extremely difficult to move the device by rotating the wheels.

In order to facilitate the moving of the device, it is desirable that a surface coating of a low coefficient of friction such as a fluorine resin (e.g., Teflon) be formed on that surface of the free end 14c which is to make contact with the wall surface so as to reduce the coefficient of friction ($K_2$) between the free end 14c and the wall surface 4, and at the same time, a surface coating of a high coefficient of friction such as a natural or synthetic rubber or a urethane resin be formed on the treads of the wheels 8a to 8d to increase the coefficient of friction ($K_1$) between the wheels 8a to 8d and the wall surface 4.

Figure 2:
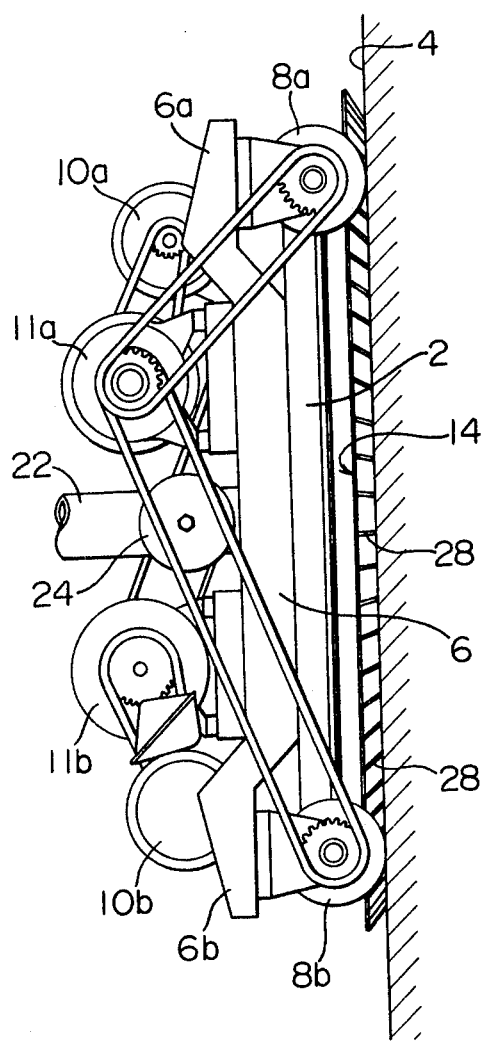
FIG. 2 is a side elevation of the device shown in FIG. 1.
Figure 3:
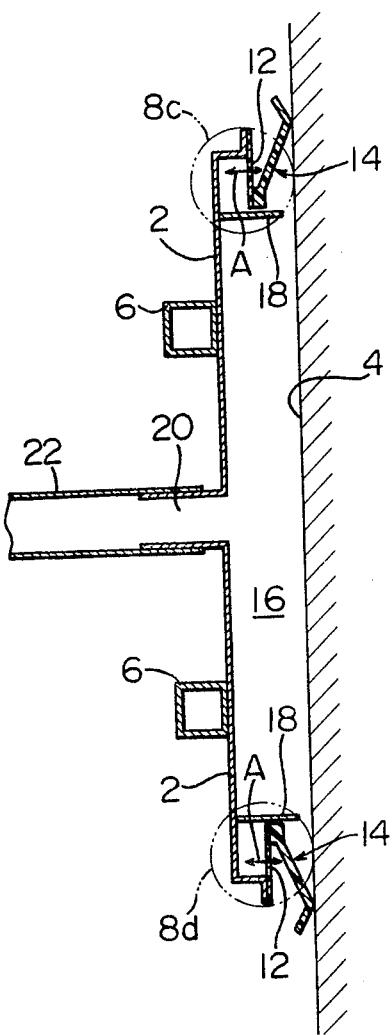
FIG. 3 is a sectional view taken along the line III—III of FIG. 1.
Figure 4:
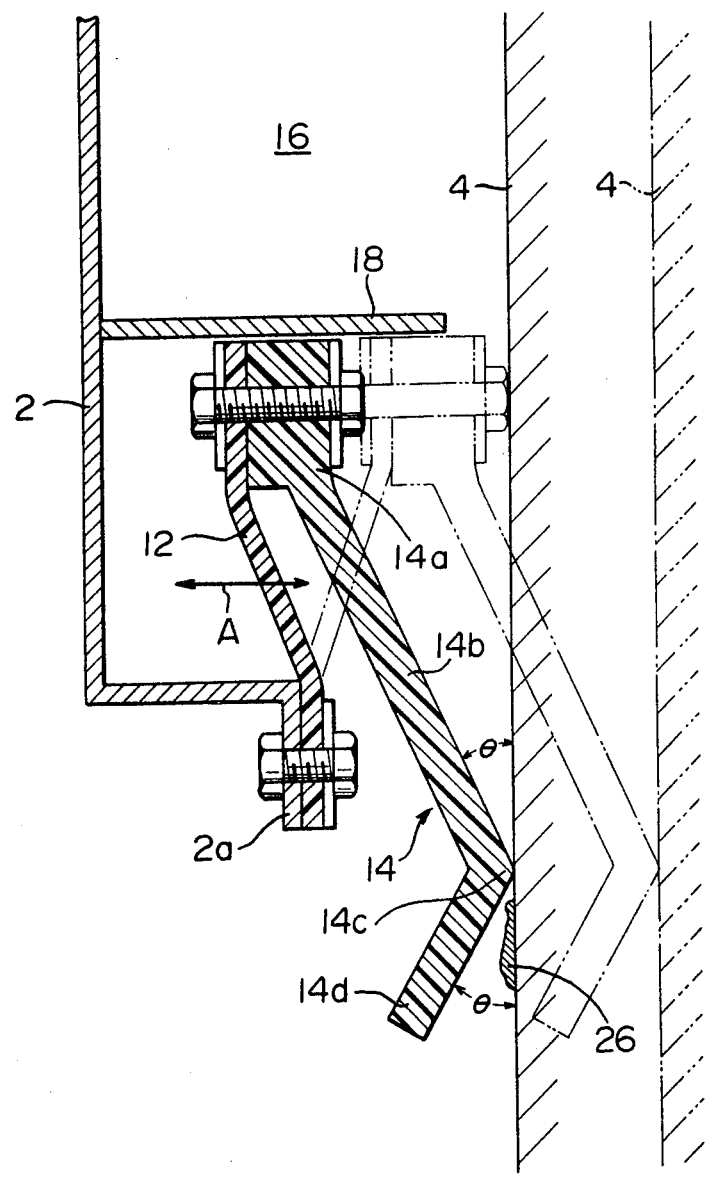
FIG. 4 is a sectional view showing a part of FIG. 3 on an enlarged scale.

Generally, projections 26 (FIG. 4) such as a weld padding are present on the wall surface 4 on which to perform works such as cleaning or painting. Thus, during the movement of the device, the free end 14c of the partition 14 stumbles on the projection 26 whereby the movement of the device is impeded, or the partition 14 is bent inwardly to extend inwardly from its free end. Consequently, the fluid pressure acting on the part 14b of the partition 14 acts to separate the free end 14c from the wall surface 4 and is likely to break the fluid-tight contact. Since, however, the partition 14 in the embodiment shown in FIGS. 1 to 4 has the extension 14d which extends from the free end 14c outwardly and away from the wall surface, and forms an angle $\theta$ to the wall surface both at the inside and outside of the free end 14c, the free end 14c of the partition 14 can pass the projection 26 without being trapped by it at the time of moving the device. Preferably, the angle $\theta$ is generally about 30° to 45°. In order that the free end 14c of the partition 14 will pass the projection 26 more easily, it is preferred, as shown in FIGS. 1 and 2, that cuts 28 be provided at predetermined intervals on the extension 14d so as to increase the flexibility of the extension 14d. Alternatively, instead of providing the cuts 28, only the extension 14d can be made thinner so that it has more flexibility than the remainder of the partition 14.

Figure 5:
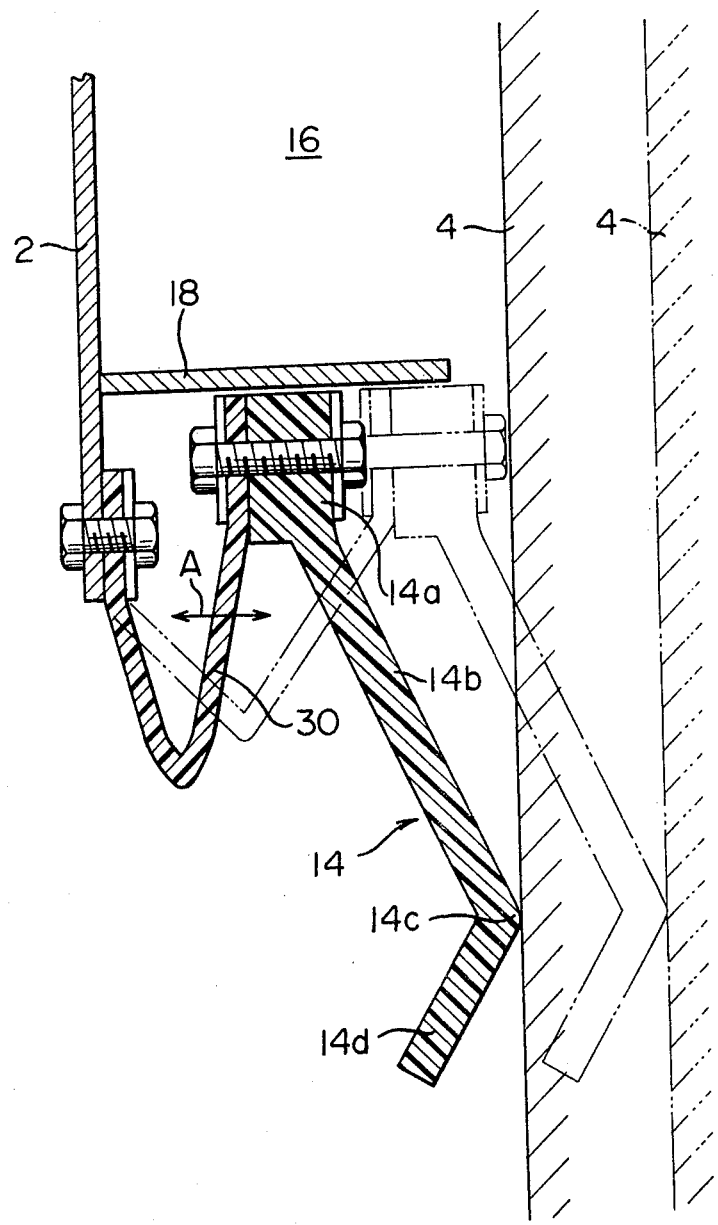

The inward bending of the partition 14 can be more completely prevented by embedding a plurality of piano wires radially in the portion 14b of the partition 14 at predetermined intervals in the peripheral direction; or by connecting the end of the extension 14d to a suitable position on the housing 2 by means of a coil-like wire, a piano wire, or a chain, etc. which can be elongated and contracted over a predetermined length. A, receiver In the embodiment shown in FIGS. 1 to 4, the partition 14 is connected to the pressure receiver housing 2 via the annular member 12 made of a flexible material and capable of deflecting in the direction of arrow A by a relatively small force, so that the partition 14 can be displaced toward and away from the wall surface 4 by a relatively small force. Instead of the annular member 12, a bellowslike member 30 freely stretchable and contractible in the direction of arrow A, as shown in FIG. 5, may be used. In another modified embodiment, the use of the annular member 12 is omitted, and the end 14a of the partition is directly connected to the housing 2 telescopically so that the partition 14 may be displaced toward and away from the wall surface 4. In the modification shown in FIG. 6, the end 14a of the partition 14 is directly fixed to the pressure receiver housing 2, and by the flexibility of the part 14b, only the forward half of the partition 14 including the end 14c is displaced toward and away from the wall surface 4 (that is, in the direction shown by arrow A).

FIGS. 7 and 8 show modifications of the partition. The partition 32 shown in FIG. 7 is one in which a portion 32b corresponding to the portion 14b of the partition 14 described hereinabove has a curved part 32e, and a free end 32c and an extension 32d extending inwardly. The partition 34 shown in FIG. 8 has an end portion 34a to be connected to the housing 2, a portion 34b extending outwardly from it, and a tubular free end portion 34c having a compressed fluid such as air filling the inside. It will be obvious without a detailed description that the partitions 32 and 34 shown in FIGS. 7 and 8 also function in the same way as the partition 14. It will also be evident that the configuration of the partition is not limited to those described hereinabove, but a partition of any configuration can be used which has a portion extending outwardly from its one end connected to the housing 2 so that its free end portion will be brought into substantially fluid-tight contact with the wall surface 4 by the fluid pressure acting on the partition itself, and which can define a substantially fluid-tight low pressure space 16 together with the housing 2 and the wall surface 4.

In the device shown in FIGS. 1 to 4, the low pressure space 16 is evacuated by connecting the low pressure space 16 with an evacuating means (not shown) through the flexible hose 22 connected to the exhaust opening 20 formed in the housing 2. If desired, a suitable evacuating means such as a vacuum pump, water pump, or ejector may be directly secured to the housing 2. However, the provision of the evacuating means directly on the housing 2 increases the weight of the device, and therefore, it is preferred that, as shown in the drawings, the low pressure space 16 be connected with an evacuating means set up, for example, on the ground or on a boat deck through a connecting means such as flexible hose 22.

Furthermore, in the embodiment illustrated, the wheels 8a to 8d are driven by the motors 10a and 10b mounted on the device thereby to move the device. If desired, as is well known to those skilled in the art, a tractive wire can be connected to a part of the device, for example, to the frame member 6, and by winding the wire by a winch set up, for example, on a ship's deck, the device can be moved.

Referring to FIGS. 9 to 19, various modifications of the device of this invention will be described below which are especially suitable when the wall surface to which the device is to adhere and along which it is to move has a large curvature.

Figure 9:
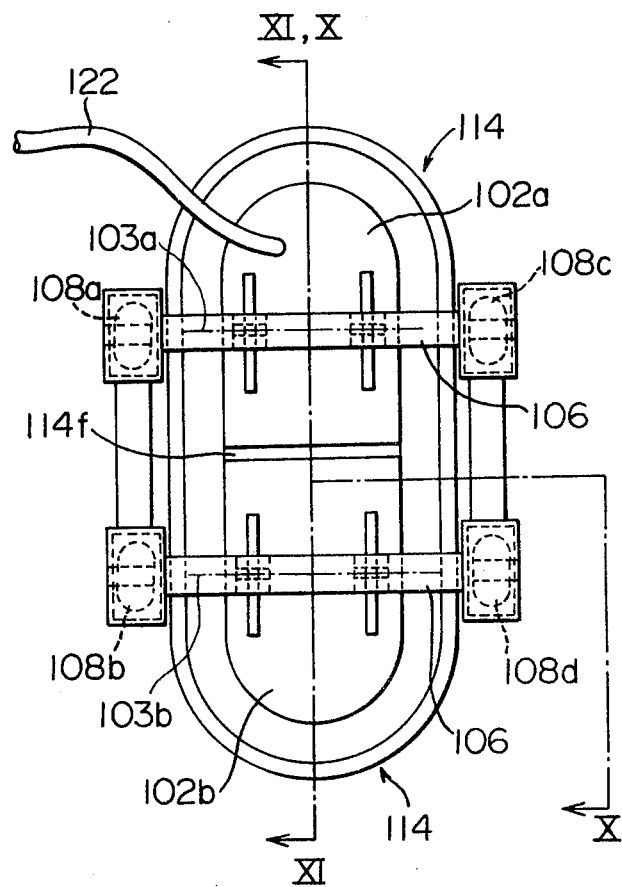

The embodiment shown in FIGS. 9 to 11 has a partition 114 generally in a substantially elliptical dish-like shape which includes a flat main portion 114a regarded as one end to be connected to the pressure receiver housing, a portion 114b extending outwardly and toward a wall surface 104 from the peripheral part of the main portion 114a, a free end portion 114c which is to contact the wall surface 104, and an extension 114d. To the main portion 114a are fixed two divided portions 102a and 102b of a pressure receiver housing. The portions 102a and 102b are connected to a rigid frame member 106 so that they can turn around axial lines 103a and 103b respectively. Four wheels 108a, 108b, 108c, and 108d are secured to the frame member 106. Although not shown in the drawings, motors and an interlocking mechanism can be provided in the frame member 106 for driving the wheels in the same way as in the embodiment shown in FIGS. 1 to 4.

Since the partition 114 is in the form of an elliptical dish, a substantially fluid-tight low pressure space 116 is defined only by the partition 114 and the wall surface 104. If desired, however, those parts of the main portion 114a which overlap the housing portions 102a and 102b can be cut away so as to define the substantially fluid-tight low pressure space 116 by the two housing portions 102a and 102b, the partition 114, and the wall surface 104. The low pressure space 116 is caused connected with an evacuating means (not shown) through a connecting means 122. It will be obvious without further description that the fluid pressure which acts on the housing portions 102a and 102b owing to the formation of vacuum within the low pressure space 116 is transmitted to the wall surface 104 via the frame member 106 and the wheels 108a to 108d whereby the device is caused to adhere to the wall surface 104.

The free end portion 114c of the partition 114, owing to the flexibility of the portion 114b, can be displaced toward and away from the wall surface 104 by a relatively small force. It will be appreciated without any detailed description that only the fluid pressure acting on the portion 114b causes the free end portion 114c to make substantially fluid-tight contact with the wall surface 104.

In the device shown in FIGS. 9 to 11, the two divided portions 102a and 102b of the housing are hinge-connected to each other by a portion 114f located between them, and each of the portions 102a and 102b is pivotably connected to the frame member 106. Thus, as will be readily appreciated from FIG. 11, even when the wall surface 104 has a small radius of curvature, the portions 102a and 102b can turn about the axial lines 103a and 103b according to the curvature of the wall surface 104 and can take a form adaptable to the wall surface 104. Accordingly, the device shown in FIGS. 9 to 11 can adhere closely to a wall surface having a small radius of curvature and move therealong.

Figure 12:
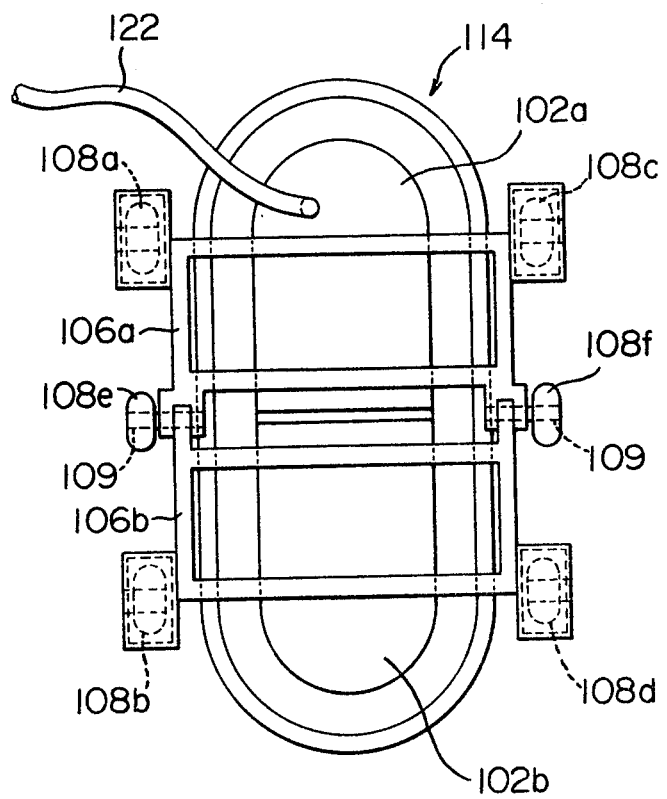

The device shown in FIGS. 12 and 13 is a modification of the device shown in FIGS. 9 to 11. In the device shown in FIGS. 12 and 13, the frame member is divided into two portions 106a and 106b hinge-connected to each other by a pin 109. Two additional wheels 108e and 108f to be brought into contact with wall surface 104 are provided on the connecting pins 109. Two portions 102a and 102b of the housing are rigidly connected to the frame portions 106a and 106b respectively. It will be appreciated that the device shown in FIGS. 12 and 13, like the device shown in FIGS. 9 to 11, can adhere closely to a wall surface having a small radius of curvature and move therealong.

In the device shown in FIG. 14, the pressure receiver housing is divided into three portions 102a, 102b and 102c which are pivotably connected respectively to the piston ends of cylinders 111a, 111b and 111c mounted on the frame member 106. Furthermore, three distance sensors 113a, 113b, 113c are secured to the frame member 106 adjacent to the portions 102a, 102b and 102c of the housing respectively. These distance sensors detect the distance from there to the wall surface 104, and according to the distance detected, automatically move the cylinders 111a, 111b and 111c back and forth. Accordingly, in the device shown in FIG. 14, the cylinders 111a, 111b and 111c are automatically moved back and forth according to the unevenness of the wall surface 104 whereby the distance between the wall surface 104 and each of the portions 102a, 102b and 102c is always maintained constant. The device shown in FIG. 14 can therefore adhere closely to a wall surface having a relatively large degree of unevenness or a wall surface having a small radius of curvature, and move therealong.

In the device shown in FIG. 15, the pressure receiver housing is divided into two portions 202a and 202b to which separate partitions 214a and 214b are connected respectively. Accordingly, two separate low pressure areas are defined in this device. The portions 202a and 202b are pivotably connected to a frame member 216 at 213a and 213b respectively, as in the device shown in FIGS. 9 to 11. The two housing portions 202a and 202b include connections 222a and 222b for communication of the low pressure areas with an evacuating means.

The device shown in FIG. 16 is a somewhat modified version of the apparatus shown in FIG. 15. Like the device shown in FIGS. 12 and 13, in the device shown in FIG. 16, the frame member is divided into two portions 206a and 206b which are hinge-connected to each other by a pin 209, and two additional wheels 208e and 208d to be contacted with the wall surface 104 are secured to the pin 209. The two portions 202a and 202b of the pressure receiver housing are rigidly connected to the frame member portions 206a and 206b, respectively.

Figure 17:
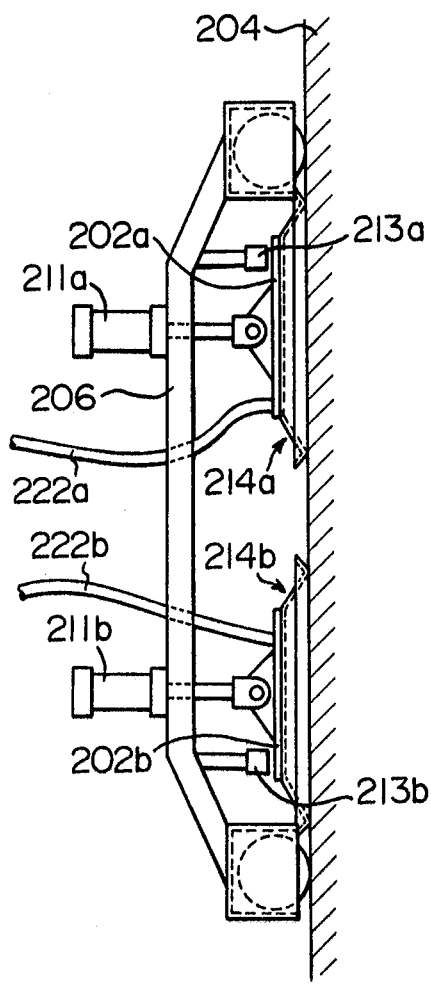

In the device shown in FIG. 17, two housing portions 202a and 202b to which separate partions 214a and 214b are connected are pivotably connected respectively to the piston ends of cylinders 211a and 211b the movement of which is automatically controlled by distance sensors 213a and 213b, as in the case of the device shown in FIG. 14.

In the devices shown in FIGS. 9 to 17, the pressure receiver housing is divided into two or three portions in order that the device will adhere closely to the wall surface and move therealong even when the wall surface has a small radius of curvature or is uneven. If desired, the housing can be divided into four or more portions. For example, a disc-like pressure receiver housing may be divided into four or more segments each of which can be connected to the frame member through a universal joint such as a ball and a socket. Furthermore, in the devices shown in FIGS. 12, 13 and 16, the frame member is divided into two portions hinge-connected to each other. If desired, the frame member can be divided into three or more portions hinge-connected to each other.

Figure 18:
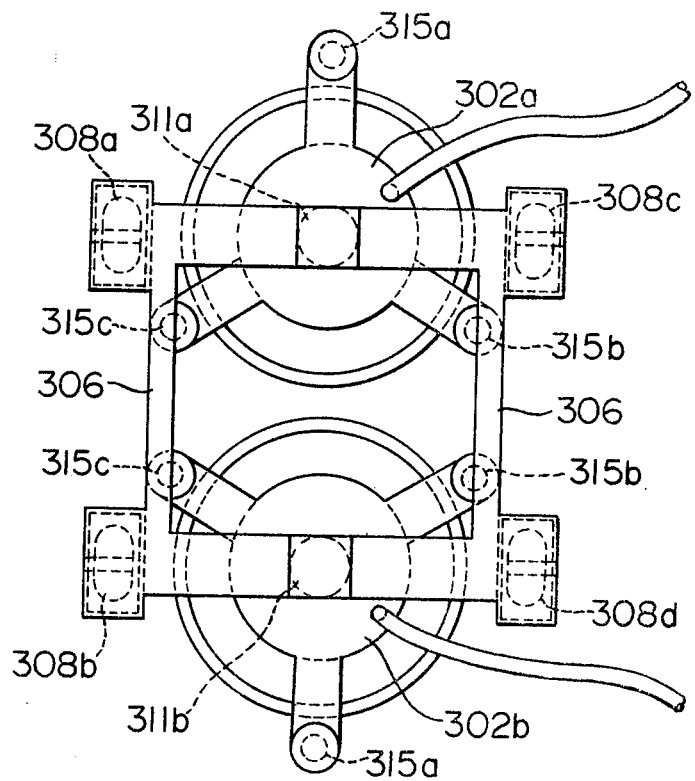
Figure 19:
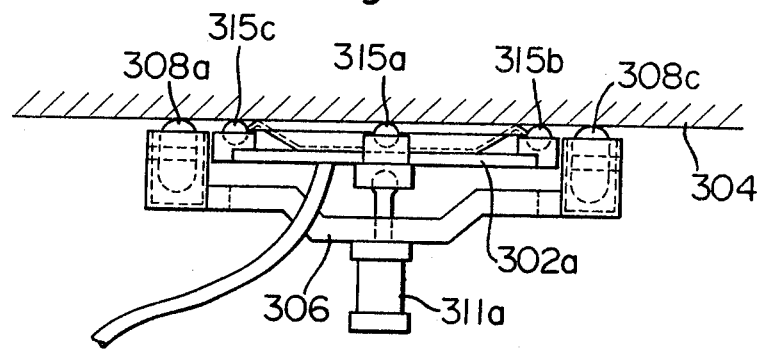
FIG. 19 is a top plan of the device shown in FIG. 18.

When two or more divided portions of the pressure receiver housing are pivotably connected to the frame member either directly or through cylinders, non-uniformity of fluid pressures acting on the individual portions of the housing may possibly cause these portions to incline, and a part of each of these portions to approach the wall surface excessively. When a part of each housing portion is caused to approach the wall surface excessively, the frictional force between the free end of the partition and the wall surface becomes excessive at that part. In order to prevent this, three ball casters 315a, 315b and 315c which make contact with the wall surface 304 and maintain the distance between the wall surface 304 and each of the housing portions 302a and 302b constant can be mounted respectively on the housing portions 302a and 302b, as shown in FIGS. 18 and 19. It is preferred that in the device shown in FIGS. 18 and 19, the housing portions 302a and 302b be connected to the frame member 306 via cylinders 311a and 311b so that the cylinders 311a and 311b pull the portions 302a and 302b toward the frame member 306 with a predetermined force. When the ball casters 315a, 315b and 315c are mounted on the portions 302a and 302b, the fluid pressure acting on the portions 302a and 302b of the housing is transmitted not through the frame members 306 and wheels 308a and 308b but mainly through the ball casters 315a, 315b and 315c. This consequently reduces the contact pressure between the wall surface 304 and the wheels 308a to 308d, and it would be impossible to move the device by driving the wheels 308a to 308d. However, by pulling the portions 302a and 302b by means of the cylinders 311a and 311b, the fluid pressure acting on the portions 302a and 302b is transmitted to the wall surface 304 mainly through the cylinders 311a and 311b, the frame member 306 and the wheels 308a to 308d, and therefore, the device can be moved by driving the wheels 308a to 308d.

FIG. 20 shows a device in accordance with this invention which is suitable for adhesion to a wall surface 404 under water and movement therealong, for example, a side wall of a ship under water. In order to make the drawing clear, the frame member and wheels, etc. are omitted in FIG. 20. In the device shown in FIG. 20, a suction conduit 425 extending to the water surface is connected to a low pressure breaker 424 mounted on a pressure receiver housing 402. When the degree of low pressure within a low pressure space 416 exceeds a certain limit, the low pressure breaker 424 opens to introduce the air from above the water into the low pressure space 416 through the suction conduit 425, and thus to maintain the degree of low pressure within the low pressure space 416 always at a constant value. A water drainage hole 421 is formed at the lower portion of the housing 402. The water drainage hole 421 is connected through a flexible hose 423 to a drainage pump 426 set up on the ground. As stated hereinabove, the free end portion to be contacted with the wall surface 404 is usually not completely brought into fluid-tight contact with the wall surface 404. Thus, some water passes through the partition 414 and the wall surface 404, and comes into the low pressure space 416. The water which has come into the low pressure space 416 is drawn into the drainage pump 426 through the flexible hose, and discharged into the sea, etc. through a drainage hose 427. Hence, the low pressure space 416 is not filled with water but the desired degree of low pressure is always produced within the low pressure space 416. Thus, the pressure of an ambient fluid, that is, the water, always acts on the pressure receiver housing 402 to cause the device to adhere closely to the wall surface 404.

In the device shown in the drawing, the drainage hole 421 is connected to the drainage pump 426 through the flexible holse 423. If desired, the drainage pump 426 may be placed on the pressure receiver housing 402 or a frame member (not shown), and directly connected to the draingage hole 421.

In the device shown in FIG. 20, an exhaust opening 420 formed in the housing 402 is connected to an evacuating means 431 such as a vacuum pump set up on the ground, through a gas-liquid separator 429 which separates water from the air sucked from the low pressure space 416 through a flexible hose 422 and discharges it into a water reservoir tank 433. The water accumulated in the tank 433 is thrown away into the sea, etc., as required.

The device of this invention is capable of adhering by suction to a wall surface in air or under water and moving therealong and can be used as a wall surface work-performing device by providing various work-performing means in the frame member or pressure receiver housing, for example, means for cleaning or polishing the wall surface (e.g., a blast-cleaning device, a scraper, a polishing belt, or a rotary brush), spray gun means for painting the wall surface, and ultrasonic probing means for detecting scars on weld paddings of the wall surface. These work-performing devices can be set up either within or outside the low pressure space. When it is desired to set up a work-performing device at the center of the adhering device and outside the low pressure space, an annular low pressure space can be formed by using an annular pressure receiver housing and a partition having a corresponding shape, and the work-performing device can then be set up at the central opening portion of the annular housing.

The device of this invention can further be used in interesting toys which adhere to a wall surface and move therealong.

Now, referring to FIGS. 21 to 23, a wall surface cleaning device in accordance with this invention will be described which includes means for cleaning the wall surface by impinging particles of a polishing and cleaning material such as a steel grit against the wall surface.

The device shown in FIG. 21 is a combination of a device similar to the device shown in FIGS. 1 to 4 which can adhere to a wall surface and move therealong, and means for impinging particles of a polishing and cleaning material against the wall surface utilizing a high speed fluid stream. In the device shown in FIG. 21, the central part of a pressure receiver housing 502 has a frustoconical shape 503 tapering in a direction away from a wall surface 504. At the end of the taper of the frustoconical shape 503 is provided an impinging nozzle 550 for impinging the particles of a polishing and cleaning material against the wall surface 504. This nozzle 550 is connected to a means (not shown) for supplying compressed air containing the polishing and cleaning particles to the nozzle 550 through a flexible hose 552. This supply means is set up, for exaple, on the ground or a ship's deck, and is known per se. At the lower part of the pressure receiver housing 502, a hole 520 is provided in order to evacuate the air from the low pressure space 516 defined by the housing 502, a partition 514 and the wall surface 504, and simultaneously to recover the cleaning particles impinged against the wall surface 504. The hole 520 is connected to the flexible hose 522 which is connected to an evacuating means (not shown) such as a vacuum pump set up, for example, on the ground, through a known separator (not shown) set up, for example, on the ground. The separator is adapted to independently separate from the exhaust stream the polishing and cleaning particles contained in the exhaust stream and the foreign matter removed from the wall surface such as rust or paint powders.

According to this device, compressed air containing the polishing and cleaning particles is impinged from the nozzle 550 against the wall surface 504 to clean the wall surface when the device adheres to the wall surface and moves along it, as described hereinabove by reference to FIGS. 1 to 4. The particles impinged against the wall surface, and the foreging matter removed from the wall surface, such as rust or paint powders, fall into the lower part of the low pressure space 516 without being dissipated outside the low pressure space 516, and are carried away by the air stream discharged from the low pressure space 516. They are carried away through the exhaust hole 520 and the flexible hose 522, and led to a separator (not shown) where they are separated from the air stream. The polishing and cleaning particles separated from the air stream independently of the foreign matter such as rust and paint powders can be re-used.

In the device shown in FIG. 21, compressed air is introduced into the low pressure space 516 from the nozzle 550. In order, therefore, to produce a predetermined degree of low pressure within the low pressure space 516, the evacuating means for evacuating the low pressure space 516 through the exhaust hole 520 is required to have a higher capacity than when compressed air is not introduced.

Figure 22:
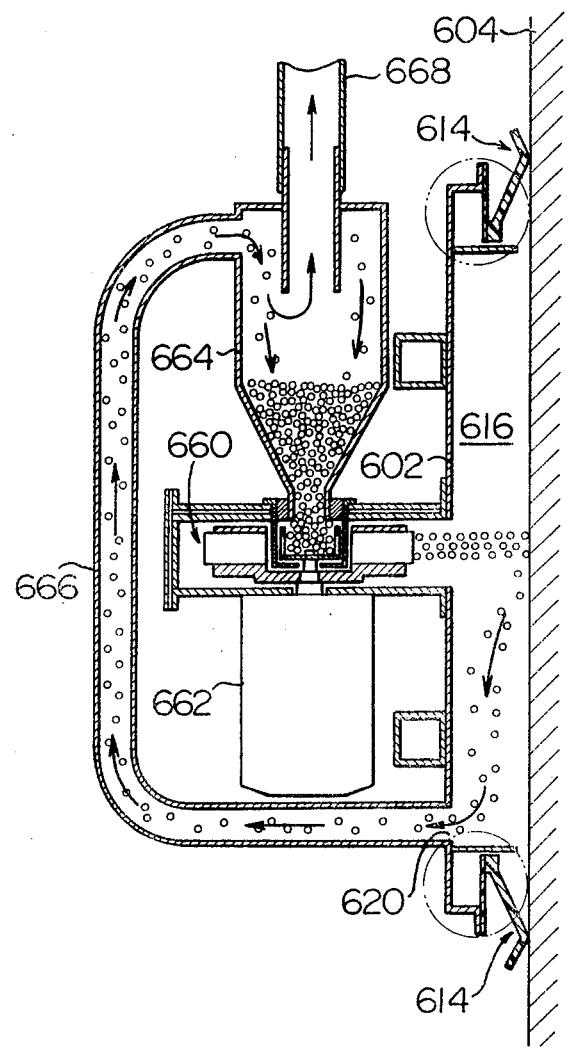

The device shown in FIG. 22 is a combination of a centrifugal impinging machine for mechanically impinging the particles of a polishing and cleaning material against a wall surface without using a fluid stream such as compressed air or high pressure water, and a device similar to the device shown in FIGS. 1 to 4 which adheres to the wall surface and moves along it.

In the device shown in FIG. 22, a known centrifugal impinging wheel 660 capable of impinging the cleaning and polishing particles against a wall surface 604 is set up at the center of a pressure receiver housing 602. Beneath the wheel 660 is provided a motor 662 the output shaft of which is connected to the wheel 660 and which rotates the wheel at a predetermined speed. Above the wheel 660 is provided a collector-feeder 664 which separates and collects the cleaning and polishing particles from the air stream, and feeds the collected particles into the center of the impinging wheel 660, as will be described hereinbelow.

A hole 620 is provided below the housing 602 for evacuating the air from a low pressure space 616 defined by the housing 602, a partition 614 and the wall surface 604, and recover the polishing and cleaning particles impinged against the wall surface 604. The hole 620 communicates with the upper lateral portion of the collector-feeder 664 through a conveyor tube 666, and then with a flexible hose 668 one end of which is connected to a tubular portion provided at the top of the collector-feeder 664. The flexible hose 668 is connected to an evauacting means (not shown) such as a vacuum pump set up, for example, on the ground, through a separator (not shown) set up, for example, on the ground for separating the foreign matter from the air stream which carries it.

When this device adheres to the wall surface 604 and moves along it as described by reference to FIGS. 1 to 4, the polishing and cleaning particles are impinged against the wall surface 604 by the impinging wheel 660 driven by motor 662 thereby to clean the wall surface 604. The polishing and cleaning particles impinged against the wall surface 604, together with the foreign matter removed from the wall surface such as rust or paint powders fall into the lower part of the low pressure space without being dissipated outside the low pressure space 616. They are carried away by the air stream evacuated from the low pressure space 616, and via the exhaust hole 620 and the conveyor tube 66, and conveyed to the collector-feeder 664. At the collector-feeder 664, the heavier polishing and cleaning particles fall onto the lower part of the collector-feeder 664, and thus are separated from the air stream. The particles so separated are again fed into the centrifugal impinging wheel 660, and impinged against the wall surface 604. On the other hand, the relatively light foreign matter such as the rust or paint powders removed from the wall surface 604 and light finely divided particles of the cleaning and polishing material resulting from impingement against the wall surface 604 are conveyed together with the air stream through the flexible hose to a separator (not shown) set up, for example, on the ground in which separator these light materials are separated from the air stream.

Since the centrifugal impinging wheel 660 capable of mechanically impinging the polishing and cleaning particles without utilizing a fluid stream such as compressed air or high pressure water is used in the device shown in FIG. 22, it is possible to produce within the low pressure space 616 a sufficient degree of low pressure to cause the device to adhere to the wall surface 604 by using an evacuating means having a relatively low capacity. Furthermore, the polisling and cleaning particles impinged against the wall surface 604 are collected by utilizing the air stream discharged from the low pressure space 616 to produce a low pressure therein, and separated from th foreign matter and the finely divided particles unsuitable for re-use. Accordingly, no special means is required for these purposes.

Figure 23:
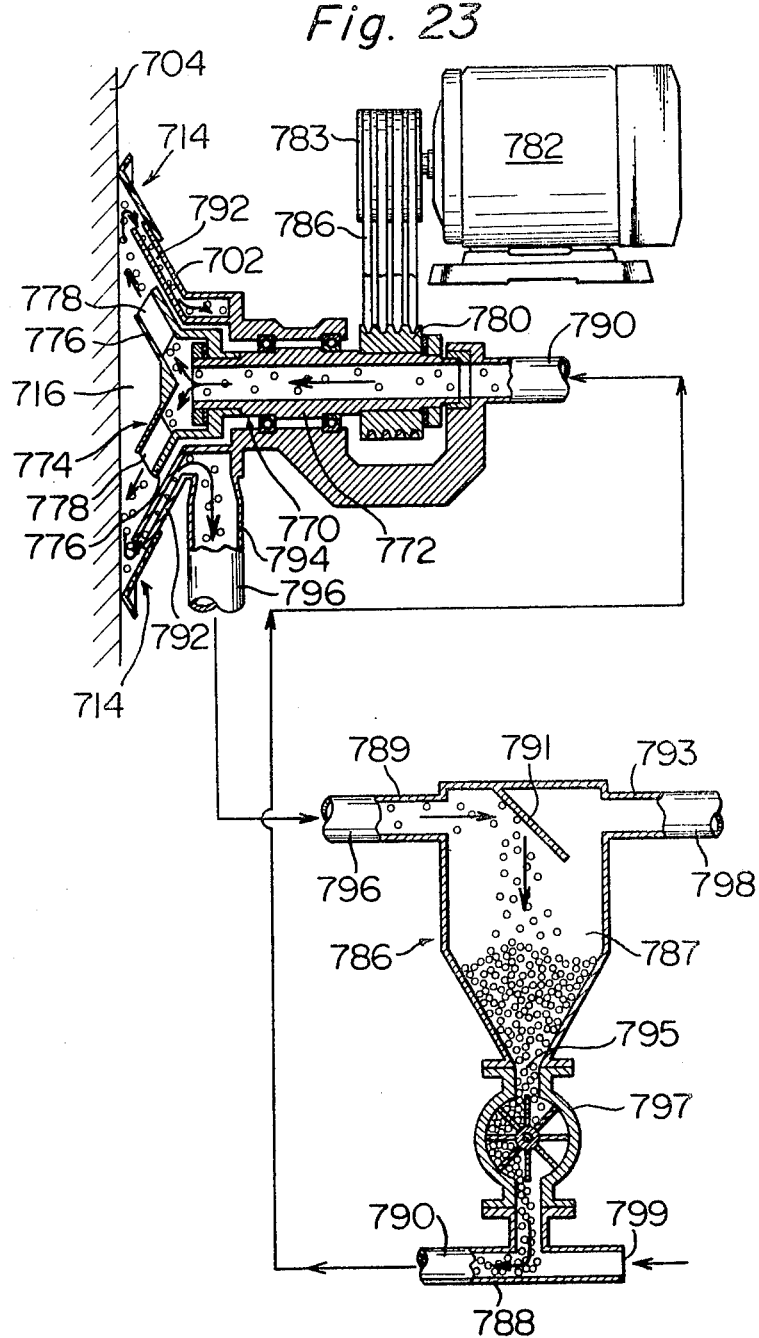

The device shown in FIG. 23, like the device shown in FIGS. 1 to 4, includes a partition 714 which defines a low pressure space 716 together with a pressure receiver housing 702 and a wall surface 704. One end of the partition 714 is directly secured to the housing 702, and therefore, like the partition 14 shown in FIG. 6, its forward half is adapted to be displaced toward and away from the wall surface 704 by a relatively small force because of its flexibility. Although not shown in FIG. 23, the device includes a rigid frame member, three or more wheels provided on the frame member, and a drive means secured to the rigid frame member for driving these wheels.

Within the housing 702 is disposed an impinging machine 770 for impinging the particles of a polishing and cleaning material, which is made up of a hollow shaft 772 mounted rotatably on the housing 702, and a vane wheel 774 fixed to the end of the shaft 772. In order that the outside air does not enter a low pressure space 716 between the pressure receiver housing 702 and the shaft 772, a seal can be provided between them although it is not shown in the drawings. The vane wheel 774 includes a pair of substantially conical plates 776 disposed at intervals in the longitudinal direction of the shaft 772, and a plurality (for example, 8) of vanes 778 fixed between the plates 776 at intervals in the circumferential direction. A pulley 780 is fixed to the hollow shaft 772 of the impinging machine 770 and the pulley 780 is connected to a pulley 784 fixed to the output shaft of a motor 782 by a belt 783 for driving the impinging machine mounted on a frame member (not shown). The hollow shaft 772 of the impinging machine 770 is connected through a flexible hose 790 to a feed secton 788 of a collector-feeder 786 for the polishing and cleaning particles which is set up, for example, on the ground or on a ship's deck.

An annular passageway 792 for evacuating the low pressure space 716 and collecting the polishing and cleaning particles, which extends around the peripheral portion of the low pressure area 716, is formed within the housing 702. The passageway 792 has an exit portion 794 to which one end of the flexible hose 796 is connected. The other end of the flexible hose 796 is connected to an entrance portion 789 formed at the upper portion of a section 787 for accomodating the polishing and cleaning particles in the collector-feeder 786. The section 787 includes a deflecting plate 791, an exit portion 793, and an opening 795 for conveying the polishing and cleaning particles. The exit portion 793 is connected by a flexible hose 798 to an evacuating means such as a vacuum pump through a separator (not shown) for separating the light foreign matter from the air stream. Between the conveyor opening 795 and the feed section 788, a known rotary valve 797 is disposed which can convey the polishing and cleaning particles within the accomodating section 787 into the feed section 788 without permitting air to pass between the accomodating section 787 and the feed section 788. That end of the feed section 788 which is opposite to the end to which the flexible hose 790 is connected has an opening 799 that leads to the outer atmosphere.

In the device shown in FIG. 23, the low pressure space 716 is evacuated by an evacuating means (not shown) through the passageway 792, the flexible hose 796, and the accomodating section 789 of the collector-feeder 786 to produce a predetermined degree of low pressure within the low pressure space 716, and thereby to cause the device to adhere to the wall surface 704. When a low pressure is created within the low pressure space 716, the outside air is sucked into the low pressure space 716 from the opening 799 of the feed section 788 through the flexible hose 790 and the hollow shaft 772 of the impinging machine 770. The flow of the outside air causes the polishing and cleaning particles conveyed from the accomodating section 787 to the feed section 788 to be sent to the vane wheel 774 through the flexible hose 790 and the hollow shaft 772. The vane wheel 774 rotated by the motor 782 mechanically accelerates the particles sent there by the sucked air stream, and impinges them against the wall surface 704 for cleaning of the wall surface 704. The polishing and cleaning particles impinged against the wall surface 704 and the foreign matter removed from the wall surface 704 are not dissipated outside the low pressure space 716, but are carried away by an air stream evacuated from the low pressure area 716, and conveyed to the accomodating section 787 of the collector-feeder 786 through the passageway 792 and the flexible hose 796. The polishing and cleaning particles which have entered the accomodating section 787 collide with the deflecting plate 791 and fall downward. Thus, they are separated from the exhaust air stream and accumulated. Then, they are conveyed from the feeding section 788 through the rotary valve 797, and re-used. The exhaust air stream which contains the foreign matter removed from the wall surface 704 and polishing and cleaning particles pulverized on collision with the wall surface 704 and being unsuitable for re-use is conveyed from the accomodating section 787 to a separator (not shown) through the exit portion 793 and the flexible hose 798. In the separator, the foreign matter and the pulverized particles unsuitable for re-use are separated from the exhaust air stream.

Since in the device shown in FIG. 23, the outside air is drawn into the low pressure space 716 from the opening 799 via the flexible hose 790 and the hollow shaft 772, an evacuating means (not shown) for producing a low pressure within the low pressure space 716 is required to have a somewhat higher capacity than the evacuating means shown in FIG. 22. However, in the device shown in FIG. 23, the feeding of the cleaning particles to the vane wheel 774 of the impinging machine 770 is performed by the sucked air stream without utilizing gravity. This offers the advantage that the cleaning particles can be fed satisfactorily without any restriction on the direction or angle, etc. of feeding them.

In the device shown in FIG. 23, the collector-feeder 786 is separated from the device which adheres to the wall surface 704 and moves along it. If desired, the collector-feeder 786 can be provided integrally with the device. Furthermore, in this device, the accomodating section 787 and the feed section 788 are integrated in the collector-feeder 786, but if desired, they can be provided separately and independently.

While the present invention has been described hereinabove in detail by reference to some specific embodiments taken in conjunction with the accompanying drawings, it will be apparent that the invention is not limited to these specific examples, but various changes and modifications are possible without departing from th scope of the invention.

What we claim is:

1. A device capable of adhering by suction to a wall surface by the pressure of an ambient fluid and movable along the wall surface, which device comprises: a pressure receiver housing made of a rigid or semi-rigid material having one side open toward the wall surface and the remainder closed; a plurality of wheels or endless tracks secured to the housing for contact with the wall surface; a partition connected to the pressure receiver housing and extending outwardly therefrom in a direction away from the central axis of the housing which is perpendicular to the wall, said partition having a free end adapted to make contact with the wall surface, at least said free end of said partition being made of a relatively flexible material, the partition contacting the wall surface for forming a substantially fluid-tight low pressure seal together with the wall surface; and a means connected to said device for discharging fluid from the space within said partition and said housing; at least the free end of said partition being displaceable toward and away from the wall surface with respect to the pressure receiver housing by a relatively small force; whereby the free end of the partition is caused to contact the wall surface in substantially fluid-tight engagement by the pressure of the fluid which acts on the surface of the partition facing away from the wall due to the difference in fluid pressure between the inside and outside of the low pressure space, and the fluid pressure acting on the outside of the pressure receiver housing due to the difference in fluid pressure between the inside and outside of the low pressure space is transmitted to the wheels or endless tracks for urging them against the wall surface.

2. The device of claim 1 which further comprises a means provided on the pressure receiver housing for driving the wheels or endless tracks.

3. The device of claim 2 wherein said device comprises a rigid frame member connected to the outside surface of the pressure receiver housing, and the means for driving the wheels or endless tracks is secured to the rigid frame member.

4. The device of claim 1 wherein the means for discharging a fluid from the low pressure space is an evacuating means having a flexible hose connected with the low pressure space.

5. The device of claim 1 which further comprises a low pressure breaker on said housing for preventing the degree of low pressure produced within the low pressure space from exceeding a predetermined level.

6. The device of claim 1 wherein that surface of each wheel or endless track which is to make contact with the wall surface has a surface coating having a high coefficient of friction, and that surface of the free end of the partition which is to make contact with the wall surface has a surface coating having a low coefficient of friction.

7. The device of claim 1 wherein the partition has a flexible material means connected to the pressure receiver housing and which is capable of deflecting toward and away from the wall surface under the effect of a relatively small force, and the entire partition is displaceable toward and away from the wall surface by the deflection of the deflecting means.

8. The device of claim 6 wherein the pressure housing receiver includes a guide means extending toward the wall surface from the pressure receiver housing for guiding the partition when the entire partition is displaced toward and away from the wall surface.

9. The device of claim 1 wherein a bellows means connects the partition to the pressure receiver housing said bellows means being stretchable and contractable toward and away from the wall surface by a relatively small force, and the entire partition being displaceble toward and away from the wall surface by the stretching or contraction of the bellows means.

10. The device of 9 wherein the pressure housing receiver includes a guide means extending toward the wall surface from the pressure receiver housing for guiding the partition when the entire partition is displaced toward and away from the wall surface.

11. The device of claim 1 wherein the partition is directly connected to the pressure receiver housing, and the free end of the partition is displaceable toward and away from the wall surface upon the application of a relatively small force due to the flexibility of the portion extending outwardly from the position at which the partition is connected to the pressure receiver housing.

12. The device of claim 1 wherein the partition has one end connected to the pressure receiver housing and a portion extending outwardly from said one end toward the wall surface, and the other end is the free end for contacting the wal surface.

13. The device of claim 12 wherein the partition further includes an extension which extends outwardly from the other end in a direction away from the wall surface.

14. The device of claim 13 wherein the extension of the partition has a plurality of cuts spaced at intervals which increase the flexibility of the extension.

15. The device of claim 14 further comprising a plurality of reinforcing members spaced at intervals on that portion of the partition which extends from the one end outwardly and toward the wall surface.

16. The device of claim 12 wherein the partition has a curved portion between the portion extending from the one end outwardly and toward the wall surface and the other end, which curved portion curves from the outward and wall surface-facing direction to the inward and wall surface-facing direction.

17. The device of claim 16 wherein the partition has an extension which extends from the other end inwardly and in a direction away from the wall surface.

18. The device of claim 17 wherein the extension of the partition has a plurality of cuts spaced at intervals which increase the flexibility of the extension.

19. Th device of claim 19 further comprising a plurality of reinforcing members spaced at intervals on that portion of the partition which extends from the one end outwardly and toward the wall surface.

20. The device of claim 12 wherein the other end of the partition is a tubular member filled with a compressed fluid.

21. The device of claim 3 wherein the pressure receiver housing is divided into at least two portions hinge-connected to each other, and said divided portions are pivotably connected to the frame member.

22. The device of claim 21 wherein the pressure receiver housing is divided into at least two portions hinge-connected to each other, and the frame member is also divided into at least two portions hinge-connected to each other, and wherein the divided portions of the housing are connected respectively to the divided portion of the frame member.

23. The device of claim 21 further comprising at least three casters on each of the divided portion of the housing for maintaining the distance between the respective portion and the wall surface constant.

24. The device of claim 3 wherein the pressure receiver housing is divided into at least two portions hinge-connected to each other, and the frame member is also divided into at least two portions hinge-connected to each other, and wherein the divided portions of the housing are connected respectively to the divided portions of the frame member.

25. The device of claim 24 further comprising cylinders connecting the divided portions of the pressure receiver housing to the frame member, said cylinders being secured to the frame member, the back-and-forth movement of the cylinders being controllable for changing the shape of the housing according to the shape of the wall surface.

26. The device of claim 24 further comprising at least three casters on each of the divided portions of the housing for maintaining the distance between the respective portion and the wall surface constant.

27. The device of claim 3 wherein the pressure receiver housing and the partition are each divided into at least two portions each constituting an independent low pressure space, and said divided portions of the housing and the partition being pivotably connected to the frame member.

28. The device of claim 27 further comprising cylinders connecting the divided portions of the pressure receiver housing to the frame members, said cylinders being secured to the frame member, the back-and-forth movement of the cylinders being controllable for changing the shape of the housing according to the shape of the wall surface.

29. The device of claim 27 further comprising at least thre casters on each of the divided portions of the housing for maintaining the distance between the respective portion and the wall surface constant.

30. The device of claim 3 wherein the pressure receiver housing and the partition are divided into at least two portions each constituting an independent low pressure space, and the frame member is divided into at least two portions hinge-connected to each other, and the divided portions of the housing being connected respectively to the divided portions of the frame member.

31. The device of claim 30 further comprising cylinders connecting the divided portion of the pressure receiver housing to the frame members, said cylinders being secured to the frame member, the back-and-forth movement of the cylinders being controllable for changing the shape of the housing according to the shape of the wall surface.

32. The device of claim 30 further comprising at least three casters on each of the divided portions of the housing for maintaining the distance between the respective portion and the wall surface constant.

33. The device of claim 1 further comprising means connected to said device for discharging a liquid coming into the low pressure space when the device adheres to a wall surface under water and moves along it.

34. The device of claim 1 wherein the pressure receiver housing has means for impinging particles of a polishing and cleaning material against the wall surface in the low pressure space, and the polishing and cleaning particles impinged against the wall surface are recovered from the low pressure space by being carried away on the fluid stream discharged from the low pressure space.

35. The device of claim 34 wherein the means for impinging the polishing and cleaning paritcles is a machine for mechanically impinging the particles against the wall surface.

36. The device of claim 35 which further includes a collector-feeder for collecting and feeding the polishing and cleaning particles, and a conveyor tube connecting the collector-feeder and the low pressure space to each other, and wherein the means for discharging a fluid from the low pressure space comprises means for evacuating the low pressure space via the collector-feeder and the conveyor tube, and the polishing and cleaning particles impinged against the wall surface by the impinging machine are carried away by the fluid stream discharged from the low pressure space and supplied to the collector-feeder via the conveyor tube, separated from the fluid stream by the collector-feeder, and fed by gravity to the impinging machine for re-use.

37. The device of claim 35 wherein the low pressure space is communicated with the outer atmosphere via the impinging machine, and the polishing and cleaning particles are fed to the impinging machine by the action of a fluid stream which is sucked into the low pressure space via the impinging machine due to the vacuum formed within the low pressure space.

* * * * *